US010405374B2

(12) United States Patent
Zhu et al.

(10) Patent No.: US 10,405,374 B2
(45) Date of Patent: Sep. 3, 2019

(54) ANTENNA SYSTEM FOR HEAD MOUNTED DISPLAY DEVICE

(71) Applicant: Google Inc., Mountain View, CA (US)

(72) Inventors: Jiang Zhu, Cupertino, CA (US); Maryam Tabesh, San Francisco, CA (US); Joseph Clayton, San Francisco, CA (US); Doug Kough, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 84 days.

(21) Appl. No.: 15/668,431

(22) Filed: Aug. 3, 2017

(65) Prior Publication Data

US 2018/0270900 A1    Sep. 20, 2018

Related U.S. Application Data

(60) Provisional application No. 62/472,968, filed on Mar. 17, 2017.

(51) Int. Cl.
*H04W 88/06* (2009.01)
*H01Q 1/22* (2006.01)
(Continued)

(52) U.S. Cl.
CPC .......... *H04W 88/06* (2013.01); *H01Q 1/2291* (2013.01); *H01Q 1/276* (2013.01);
(Continued)

(58) Field of Classification Search
CPC ...... H01Q 1/273; H01Q 1/2291; H01Q 1/243; H01Q 21/24; H01Q 21/28; H01Q 21/30;
(Continued)

(56) References Cited

U.S. PATENT DOCUMENTS 6,642,892 B2   11/2003   Masaki et al.
8,736,516 B2 *  5/2014   Jacobsen ................. G06F 3/011
                                                          345/156
(Continued)

OTHER PUBLICATIONS

Office Action and Translation Thereof dated May 9, 2018 for Chinese Utility Model Application No. 201721550641.X, 4 pages.
(Continued)

*Primary Examiner* — Dung B Huynh

(57) ABSTRACT

A head mounted display (HMD) device includes a housing configured to mount on a face of a user, at least one display mounted in the housing, a wireless personal area network (WPAN) antenna mounted in a medial region of the housing, and first and second wireless local area network (WLAN) antennas located at respective lateral peripheries of the housing. The WPAN antenna includes a directional patch antenna comprising a feed line, a three-dimensional (3D) ground plane formed as a plurality of conductive sidewalls and a ground plane structure disposed at a first end of the sidewalls, wherein the ground plane structure is substantially perpendicular to the plurality of sidewalls. The WPAN antenna also includes a radiating surface disposed at a second end of the sidewalls opposite of the first end, wherein the radiating surface includes a patch antenna structure coupled to the feed line.

12 Claims, 10 Drawing Sheets

(51) Int. Cl.

| | | |
|---|---|---|
| *H01Q 1/48* | (2006.01) | |
| *H01Q 9/04* | (2006.01) | |
| *H01Q 21/28* | (2006.01) | |
| *H01Q 1/27* | (2006.01) | |
| *H01Q 5/30* | (2015.01) | |
| *H04B 7/06* | (2006.01) | |
| *H04B 7/08* | (2006.01) | |
| *G02B 27/01* | (2006.01) | |

(52) U.S. Cl.
  CPC ............... *H01Q 1/48* (2013.01); *H01Q 5/30* (2015.01); *H01Q 9/0407* (2013.01); *H01Q 9/0421* (2013.01); *H01Q 21/28* (2013.01); *H04B 7/06* (2013.01); *H04B 7/08* (2013.01); *G02B 27/017* (2013.01)

(58) Field of Classification Search
  CPC .............. H01Q 25/005; H01Q 1/2266; G02B 2027/014; G02B 27/017; G02C 11/10; G04G 17/08; G04G 21/04; H04B 1/3833; H04M 1/05; H04W 88/06; H04Q 3/24
  See application file for complete search history.

(56) References Cited

U.S. PATENT DOCUMENTS

| | | | | |
|---|---|---|---|---|
| 8,914,019 B1* | 12/2014 | Choi | ................ | H04W 72/048 455/422.1 |
| 9,092,898 B1 | 7/2015 | Fraccaroli et al. | | |
| 9,160,064 B2 | 10/2015 | Ferguson | | |
| 9,412,201 B2* | 8/2016 | Kinnebrew | ........... | G06T 19/006 |
| 9,432,070 B2 | 8/2016 | Mercer | | |
| 9,576,398 B1* | 2/2017 | Zehner | ................ | H04W 8/005 |
| 9,608,331 B1* | 3/2017 | Rowson | ................ | G06F 1/163 |
| 2002/0105931 A1* | 8/2002 | Heinonen | ......... | H04L 29/12009 370/338 |
| 2003/0064712 A1* | 4/2003 | Gaston | ................ | H04W 88/06 463/40 |
| 2006/0133259 A1* | 6/2006 | Lin | ........................ | H04L 1/20 370/208 |
| 2007/0069976 A1* | 3/2007 | Willins | ................ | G02B 27/017 345/8 |
| 2007/0268316 A1* | 11/2007 | Kajita | ................ | G06T 5/006 345/642 |
| 2008/0007457 A1* | 1/2008 | Copeland | ................ | H01Q 1/22 343/700 MS |
| 2008/0055537 A1* | 3/2008 | Asrani | ................ | H01Q 1/273 351/41 |
| 2009/0153128 A1 | 6/2009 | Yu | | |
| 2009/0156128 A1* | 6/2009 | Franson | ............... | G02B 27/017 455/66.1 |
| 2009/0167616 A1 | 7/2009 | Chen | | |
| 2010/0053006 A1* | 3/2010 | Miyoshi | ................ | H01Q 9/27 343/742 |
| 2010/0073236 A1* | 3/2010 | Mierke | ................ | H01Q 9/0414 343/700 MS |
| 2010/0227570 A1* | 9/2010 | Hendin | ................ | H04B 1/006 455/78 |
| 2011/0149920 A1* | 6/2011 | Liu | ...................... | H04B 1/1036 370/336 |
| 2011/0280224 A1* | 11/2011 | Falck | ................ | H04W 72/1215 370/336 |
| 2012/0235635 A1* | 9/2012 | Sato | ................ | H01Q 1/243 320/108 |
| 2012/0306698 A1* | 12/2012 | Warnick | ................ | H01Q 5/35 342/372 |
| 2013/0112195 A1* | 5/2013 | Smith | ................ | G02B 27/017 128/202.13 |
| 2013/0265199 A1* | 10/2013 | Koskiniemi | ............ | G01S 19/14 342/450 |
| 2014/0092029 A1* | 4/2014 | Nguyen | ................ | G06F 1/169 345/173 |
| 2014/0113615 A1* | 4/2014 | Yao | ..................... | H04M 1/6066 455/418 |
| 2014/0135060 A1* | 5/2014 | Mercer | ................ | H04B 1/3833 455/552.1 |
| 2014/0203950 A1* | 7/2014 | Zdeblick | ............. | G06F 19/3418 340/870.07 |
| 2014/0235169 A1* | 8/2014 | Parkinson | ............... | G06F 3/012 455/41.2 |
| 2014/0244007 A1* | 8/2014 | Kampman | ........... | G06F 19/3481 700/91 |
| 2014/0316230 A1* | 10/2014 | Denison | ............. | A61B 5/04012 600/383 |
| 2014/0320399 A1* | 10/2014 | Kim | ................ | G02B 27/017 345/156 |
| 2014/0345845 A1* | 11/2014 | Fadell | ................ | G05D 23/1902 165/237 |
| 2014/0361977 A1* | 12/2014 | Stafford | ............. | G02B 27/0093 345/156 |
| 2014/0364197 A1* | 12/2014 | Osman | .................... | A63F 13/00 463/24 |
| 2015/0109186 A1* | 4/2015 | Layson, Jr. | .......... | G02B 27/017 345/8 |
| 2015/0130355 A1* | 5/2015 | Rains, Jr. | ........... | H05B 37/0227 315/134 |
| 2015/0157255 A1* | 6/2015 | Nduka | ................... | A61B 5/165 600/301 |
| 2015/0358614 A1* | 12/2015 | Jin | ........................ | G02B 27/017 348/49 |
| 2016/0004306 A1* | 1/2016 | Maltz | ...................... | G06F 3/013 345/173 |
| 2016/0011420 A1* | 1/2016 | Jang | ................... | G02B 27/0172 345/8 |
| 2016/0163283 A1* | 6/2016 | Chang | ........................ | G06T 7/73 345/633 |
| 2016/0187969 A1* | 6/2016 | Larsen | .................... | G06F 3/012 345/156 |
| 2016/0187974 A1* | 6/2016 | Mallinson | ............... | G06F 3/014 463/32 |
| 2016/0197396 A1* | 7/2016 | Choi | ...................... | H01Q 1/243 343/702 |
| 2016/0197403 A1* | 7/2016 | Choi | ...................... | H01Q 1/243 343/700 MS |
| 2016/0226132 A1 | 8/2016 | Kim et al. | | |
| 2016/0227350 A1* | 8/2016 | Zhang | ................ | H04L 61/6022 |
| 2016/0238692 A1* | 8/2016 | Hill | ....................... | G02B 27/017 |
| 2016/0259404 A1* | 9/2016 | Woods | .................. | G06F 3/0346 |
| 2016/0274752 A1* | 9/2016 | Zhu | ..................... | G02B 27/0172 |
| 2016/0344091 A1 | 11/2016 | Trani | | |
| 2016/0344096 A1* | 11/2016 | Erentok | ................ | H01Q 1/273 |
| 2016/0364198 A1* | 12/2016 | Song | ................... | G06F 3/1454 |
| 2016/0364910 A1* | 12/2016 | Higgins | ................ | G02B 27/017 |
| 2016/0379407 A1* | 12/2016 | Foster | ................... | H04N 13/344 345/633 |
| 2017/0011706 A1* | 1/2017 | Namkung | ............... | G09G 5/006 |
| 2017/0045941 A1* | 2/2017 | Tokubo | ................ | G06F 3/167 |
| 2017/0054217 A1* | 2/2017 | Hashimoto | .......... | H01Q 9/0457 |
| 2017/0087476 A1* | 3/2017 | Perry | ...................... | A63F 13/86 |
| 2017/0111723 A1* | 4/2017 | Boesen | ................ | G02B 27/017 |
| 2017/0115728 A1* | 4/2017 | Park | .................... | H04W 72/0446 |
| 2017/0277222 A1* | 9/2017 | Matsuzawa | ............ | G06F 1/163 |
| 2017/0301135 A1* | 10/2017 | Jagnow | ................ | H04W 88/06 463/40 |
| 2017/0366957 A1* | 12/2017 | Oren | .................... | H04W 8/005 |
| 2018/0034148 A1 | 2/2018 | Nam et al. | | |
| 2018/0076529 A1* | 3/2018 | Minard | ................ | H01Q 1/42 |
| 2018/0103917 A1* | 4/2018 | Kim | ................ | G02B 27/017 |
| 2018/0152840 A1* | 5/2018 | Nagasaki | ........... | G05D 23/1902 165/237 |
| 2018/0196262 A1* | 7/2018 | Cage | ...................... | H01Q 1/22 343/700 MS |
| 2018/0227959 A1* | 8/2018 | Fraccaroli | ............ | H04W 76/14 |
| 2018/0239417 A1* | 8/2018 | Fu | ........................ | G06F 3/0488 |

(56) References Cited

U.S. PATENT DOCUMENTS

2018/0246328 A1* 8/2018 Song ............... H04W 4/18
2018/0248811 A1* 8/2018 Di Nallo ........... H04W 72/0446

OTHER PUBLICATIONS

Combined Search and Examination Report dated Apr. 26, 2018 for GB Application No. GB1717609.0, 9 pages.
International Search Report and Written Opinion dated Feb. 20, 2018 for PCT Application No. PCT/US2017/059052, 16 pages.
Song Xiao, et al., "A single-layer wideband cavity-backed microstrip patch antenna", 2015 IEEE International Symposium on Antennas and Propagation & USNC/URSI National Radio Science Meeting, Jul. 19, 2015, 2 pages.
Dan Sun, et al., "Application of Novel Cavity-Backed Proximity-Coupled Microstrip Patch Antenna to Design Broadband Conformal Phased Array", IEEE Antennas and Wireless Propagation Letters, IEEE, Piscataway, NJ, US, Jan. 1, 2010, 4 pages.
Cihangir A., et al., "MIMO antenna concept for 4G electronic eyewear devices", 2013 IEEE Antennas and Propagation Society International Symposium (APSURSI), IEEE, Jul. 6, 2014, 2 pages.
Notice of Grant and translation thereof dated Aug. 16, 2018 for Chinese Utility Model Application No. 201721550641.X, 7 pages.
Written Opinion of the International Preliminary Examining Authority dated Feb. 7, 2019 for corresponding International Application No. PCT/US2017/059052, 6 pages.
Notice of Grant dated Dec. 21, 2018 for corresponding CN Application No. 201821181069.9, 4 pages.

* cited by examiner

ANTENNA SYSTEM FOR HEAD MOUNTED DISPLAY DEVICE

CROSS-REFERENCE TO RELATED APPLICATIONS

The present application claims priority to pending U.S. Patent Application Ser. No. 62/472,968, filed on Mar. 17, 2017 and entitled "Antenna System for Head Mounted Virtual Reality Device", the entirety of which is incorporated by reference herein.

BACKGROUND

Field of the Disclosure

The present disclosure relates generally to head mounted display (HMD) devices and, more particularly, to antenna systems for HMD devices.

Description of the Related Art

Typically, a head mounted display (HMD) device is connected to one or more external data sources for streaming of video or graphics content in support of an immersive augmented reality (AR) or virtual reality (VR) experience facilitated by the HMD device. Previously, the connection between an external data source and the HMD device was provided via a wired tether. However, such corded connections are relatively heavy and thus fatigue the user, or otherwise inhibit the user's mobility. As such, some HMD devices do away with the wired connection in favor of a wireless local area network (WLAN) link with the external data source via an inverted-F antenna or monopole antenna in the HMD device. Moreover, HMD devices increasingly are being configured to support wireless connections between the HMD device and various personal devices, such as a laptop computer, a smartphone, an audio system, etc., or a handheld controller via a wireless personal area network (WPAN) supported by a WPAN antenna mounted on the HMD device.

Often, sufficient isolation between an inverted-F antenna or monopole antennas utilized for WPAN and WLAN purposes in general systems can be obtained by one or more of: providing sufficient distance between the two antennas; operating the two antennas at different center frequencies; or configuring the two antennas so that they do not operate concurrently (that is, are time-multiplexed). However, these solutions typically are not practicable in HMD device implementations. The typical dimensions of an HMD device generally do not allow inverted-F/monopole antennas to be separated sufficiently to provide adequate isolation. Time-multiplexing between the two antennas in an HMD device likewise is often undesirable as doing such would significantly cut the effective bandwidths of both antennas. As for separating the antennas in the frequency spectrum, this approach would limit the number and types of devices to which the HMD device could connect. To illustrate, while IEEE 802.11-compliant WLAN antennas may operate at either the 2.4 gigahertz (GHz) band or the 5 GHz band, Bluetooth-compliant WPAN antennas operate at only the 2.4 GHz band, and thus limiting the WLAN antenna to only the 5 GHz band would prevent the WLAN antenna from connecting to access points and other WLAN-enabled devices that operate only in the 2.4 GHz band.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
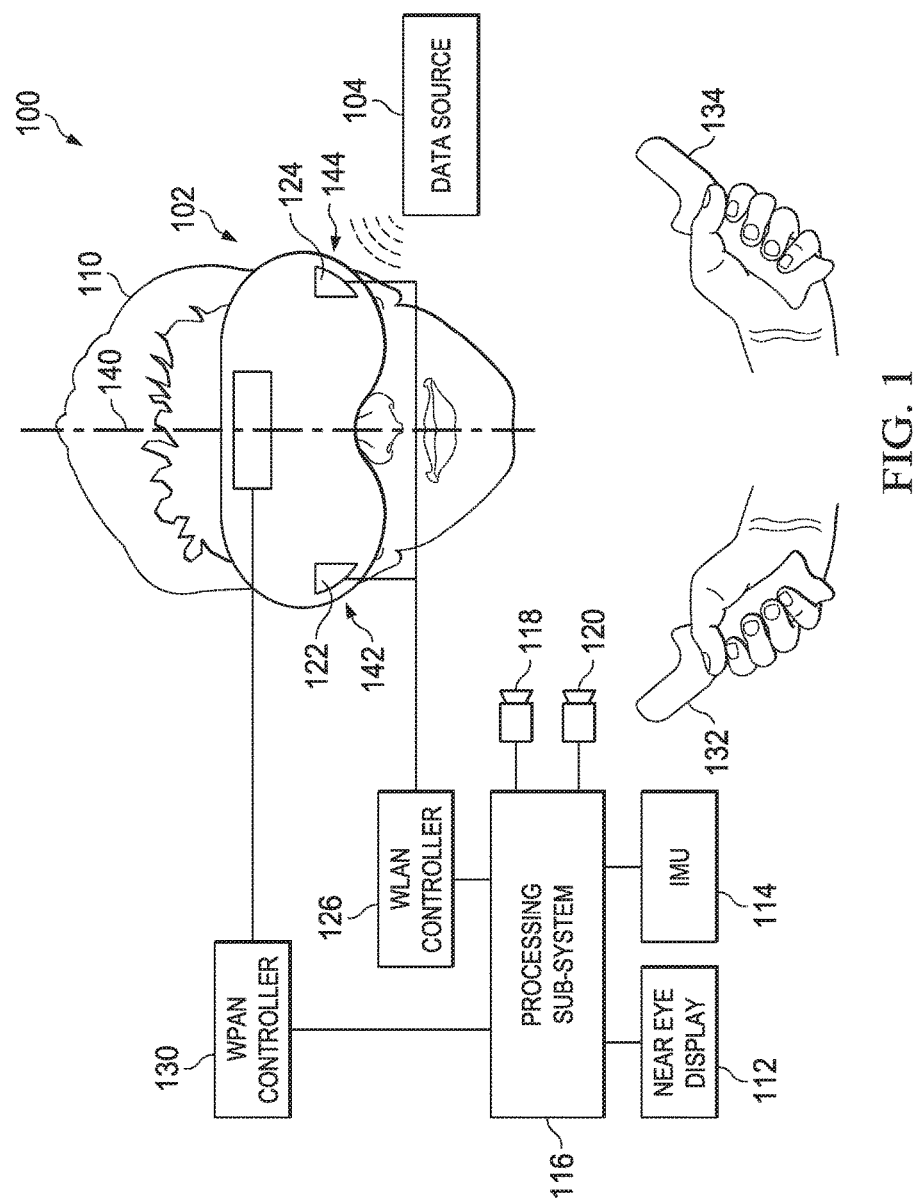
FIG. 1 is a diagram illustrating an HMD system utilizing HMD-mounted wireless local area network (WLAN) and wireless personal area network (WPAN) antennas that provide effective antenna isolation during concurrent use in accordance with some embodiments.

FIGS. 1-10 illustrate example systems and techniques for facilitating concurrent WPAN and WLAN communications at a HMD device with adequate antenna isolation. In at least one embodiment, the HMD device includes a housing configured to be mounted on the face of a user, with one or more near-eye displays mounted therein for the display of VR or AR content to the user. The HMD device further includes a WPAN antenna mounted in a medial region of the housing (that is, a region of the housing aligned with the sagittal plane of the user's head when mounted thereon) and two WLAN antennas mounted at respective lateral peripheral regions of the housing (that is, at regions of the housing distal to the medial plane of the user's head). The two WLAN antennas together may be operated to provide a dual-channel multiple-input multiple (MIMO) WLAN antenna structure. In operation, one or both of the WLAN antennas can be operated to wirelessly stream video/graphics content from a notebook computer, server computer, or other data source for display at the one or more near-eye displays of the HMD device. Concurrently, the WPAN antenna can be operated to wirelessly communicate with various devices in near proximity to the HMD device, including, but not limited to, one or more handheld controllers associated with the HMD device, user-personal devices, such as a notebook computer, a computing-enabled portable phone (that is, a "smartphone"), and the like.

The mounting of the WPAN antenna in the medial region of the housing while mounting the two WLAN antennas in the distal lateral peripheral regions of the housing provides an effective optimization of the physical distance separating the two WLAN antennas from each other and the physical distance separating each of the WLAN antennas from the WPAN antenna given the constraining dimensions of the housing itself. As such, this particular mounting configuration effectively optimizes the antenna isolation between the antennas due to signal attenuation over distance.

Moreover, to further improve isolation between the three antennas, one or both of the WPAN antenna and the WLAN antenna may be implemented using directional patch antennas, which provide orthogonal radiation patterns compared to the monopole or inverted-F antennas conventionally utilized in HMD devices, and thus provide the benefit of improved antenna isolation due to their directed radiation patterns, while also substantially reducing the amount of radiation emitted in the direction of the user's head, and thereby allaying a potential health concern. Further, in some embodiments, the directional patch antennas are implemented utilizing a three-dimensional (3D) ground plane in which a planar ground plane and conductive sidewalls are electrically coupled so as to effectively form a 3D open-ended conductive polygonal prism, or 3D ground plane, below the radiating structure of the directional patch antenna, which serves to improve the directionality of the radiation pattern of the directional patch antenna while further reducing radiation emitted in the direction of the user's head.

FIG. 1 illustrates a HMD-based system 100 for providing AR or VR content to a user in accordance with at least one embodiment of the present disclosure. The system 100 includes an HMD device 102 and one or more external data sources 104. The HMD device 102 includes a housing 106 to mount on the head 108 of a user. The housing 106 contains various electronic and optical components used to display visual content to the user, output audio content to the user, and track a pose of the HMD device 102, such as one or more near-eye displays 112, an inertial management unit (IMU) 114 comprising one or more inertia/movement-based sensors, a processing sub-system 116, one or more image sensors 118, 120, as well as one or more audio speakers, lenses or other optical elements, and the like (not shown). Further, to facilitate wireless communications with the one or more external data sources 104, the housing 106 contains a pair of WLAN antennas 122, 124 and a WLAN controller 126 serving as an interface between the WLAN antennas 122, 124 and the processing sub-system 116. To facilitate wireless communications with one or more proximate devices via a WPAN link, the housing 106 also contains a WPAN antenna 128 and a WPAN controller 130 serving at an interface between the WPAN antenna 128 and the processing sub-system 116. Such proximate devices can include, for example, one or a pair of wireless handheld controllers 132, 134 for the HMD device 102, a cellular phone, a notebook computer, and the like.

As a general overview of the operation of the system 100, the HMD device 102 operates to display visual content via the one or more near-eye displays 112 and output audio content via one or more speakers (not shown). The visual and audio content are sourced from the external data source 104, which may comprise, for example, a remote server, a local notebook computer or desktop computer, and the like. The visual and audio content are streamed to the processing sub-system 116 via a WLAN link established via the WLAN controller 126 and one or both of the WLAN antennas 122, 124, which may operate together as a dual-channel MIMO WLAN antenna. The WLAN controller 126 and WLAN antennas 122, 124 may implement any of a variety or combination of WLAN specifications, such as one or more of the IEEE 802.11a/b/g/n/ac/ad specifications (also known as the WiFi specifications) to wirelessly connect to a corresponding wireless access point. As the video data is received via the WLAN link, one or more processors (not shown) of the processing sub-system 116 execute software stored in one or more memories (not shown) to process the received video data is processed to render sequences of image frames that are then displayed at the near-eye display 112.

Concurrently, the processing sub-system 116 executes software to continuously update a pose of the HMD device 102, whereby the pose may comprise one or both of a position or orientation of the HMD device 102. As part of this process, the processing sub-system 116 may utilize positional/inertial information from a magnetometer, gyroscope, GPS interface, or other sensor of the IMU 114. Further, the processing sub-system 116 may utilize imagery from one or more of the imaging sensors 118, 120, as well as depth information from one or more depth sensors, to determine spatial features in the environment of the HMD device 102, and use various visual telemetry techniques to facilitate determination of the pose. The current pose of the HMD device 102 typically is utilized by the processing sub-system 116 to control the perspective of a scene from which the sequences of images are rendered so as to provide an immersive AR or VR experience to the user.

In some embodiments, the system 100 utilizes one or both of the wireless handheld controllers 132, 134 to enable a user to provide gesture commands and other user input to control the operation of the system 100. As such, the handheld controllers 132, 134 typically include an IMU with one or more positional/inertial sensors to detect the user's manipulation of the handheld controller in order to detect such gesture commands. To eliminate the need for wired connections between the handheld controllers 132, 134 and the HMD device 102, the handheld controllers 132, 134 can instead utilize WPAN antennas to establish a WPAN link with the WPAN antenna 128 and the WPAN controller 130 and communicate the sensor data to the processing sub-system 116 via the WPAN link for IMU sensor fusion and gesture detection processing. The WPAN antenna 128 and WPAN controller 130 can be configured to be compatible with one or more of a variety of WPAN specifications, such as a Bluetooth specification and an IEEE 802.15 specification.

WPAN and WLAN specifications often enable operation in the same frequency spectrum. To illustrate, many of the IEEE 802.11 WLAN specifications provide for operation in the 2.4 GHz spectrum, which is the same spectrum specified by the Bluetooth and IEEE 802.15 WPAN specifications. Accordingly, since it is impracticable to time-multiplex the operations of the WLAN antennas 122, 124 and the WPAN antenna 128 due to the data transmission rates required by the HMD device 102 using these antennas, the temporal and spectral coexistence of the antennas 122, 124, 128 can lead to interference issues and the data error rates resulting therefrom. The relatively small dimensions of the housing 106 prohibit the conventional solution to interference issues though significant spatial separation between the antennas 122, 124, 128.

The HMD device 102 mitigates such interference issues through a two prong approach: (1) utilization of effective directional patch antennas to as to provide directed radiation patterns that reduce interference and reduce radiation toward the user's head; and (2) a particular positioning of the antennas 122, 124, 128 so as to optimize the spacing between the antennas 122, 124, 128 while also utilizing the directed radiation pattern of the WPAN antenna 128 to effectively communicate with the wireless handheld controllers 132, 134 in their expected range of positions while in use and the directed radiation patterns of the WLAN antennas 122, 124 to provide dual channel MIMO operation. Simulations have demonstrated that this two-pronged approach can provide antenna isolation of approximately 31 decibels (dB) in a typical HMD configuration, which exceeds the 25 dB isolation threshold identified as the minimum suitable for effective coexistent antenna operation.

With regard to the utilization of a directional patch antenna for one or more of the antennas 122, 124, 128, in some embodiments the directional patch antenna utilizes a conductive ground plane and conductive sidewalls substantially orthogonal to the conductive ground plane and electrically coupled to the conductive ground plane so as to effectively form a 3D ground plane structure underneath the radiating element structure of the directional patch antenna. That is, the conductive ground plane and sidewalls form an open ended conductive box (or other 3D structure) that serves as, in effect, a radio frequency (RF) faraday cage for the radiating elements of the antenna. By using such a 3D ground plane rather than a conventional flat/planar ground plane, the size of the antenna may be reduced to below half of the wavelength of the center frequency (that is, less than $\lambda/2$) due to the fringing fields on the sidewalls of the 3D ground plane. Moreover, this 3D ground plane structure is effective at dampening radiation in the direction of the user's head. Examples of 3D ground plane-based implementations of the antennas 122, 124, 128 are described below with reference to FIGS. 2-10.

As for the particular positioning of the antennas 122, 124, 128 with respect to the housing 106 of the HMD device 102, the inventors have discovered that positioning of the WPAN antenna 128 in a medial region 138 of the housing 106 such that the WPAN antenna 128 is substantially centered about the sagittal plane 140 of the user at a top edge of the housing 106 while the WLAN antennas 122, 124 are positioned at lateral distal regions 142, 144, respectively, such that the WLAN antennas 122, 124 are located proximate to the respective lateral edges of the housing 106, and more particularly in some implementations, at the lateral-most extent of the lateral edges of the lower half of the housing 106. In such a configuration, an effective balance between maximizing the distance between the WLAN antennas 122, 124 and the distances between the WLAN antennas 122, 124 and the WPAN antenna 128 may be achieved, while also providing a wide field of view and uniform radiation for wireless communication between the WPAN antenna 128 and the wireless handheld controllers 132, 134 when they are positioned in front of the user as is expected and facilitating surface wave generation to reach the area behind the user's head. An example implementation of this particular positioning is described in more detail below with reference to FIG. 10.

Figure 2:
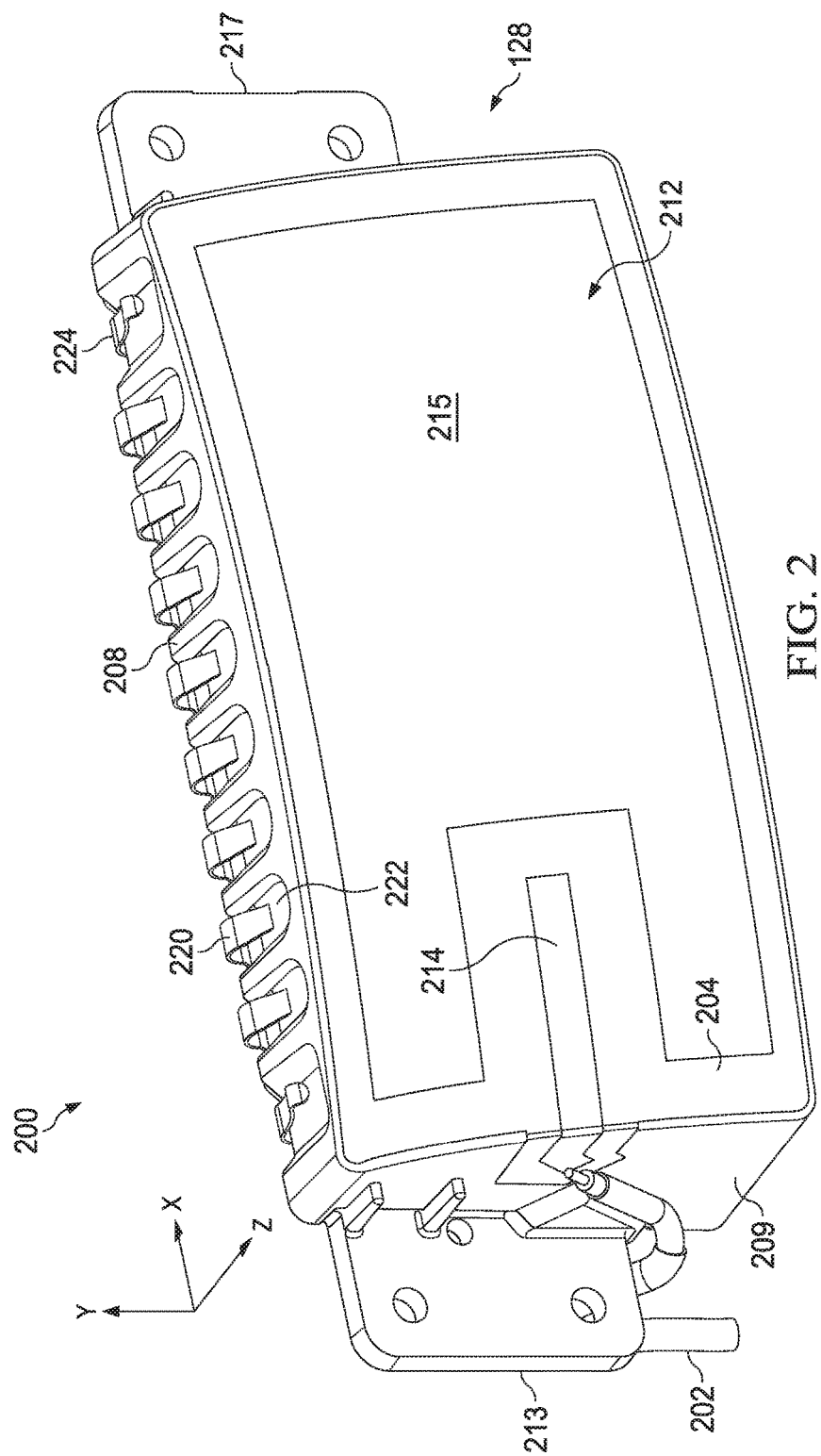
FIG. 2 is a diagram illustrating a left-side front perspective view of a WPAN antenna of an HMD device of the system of FIG. 1 in accordance with some embodiments.
Figure 3:
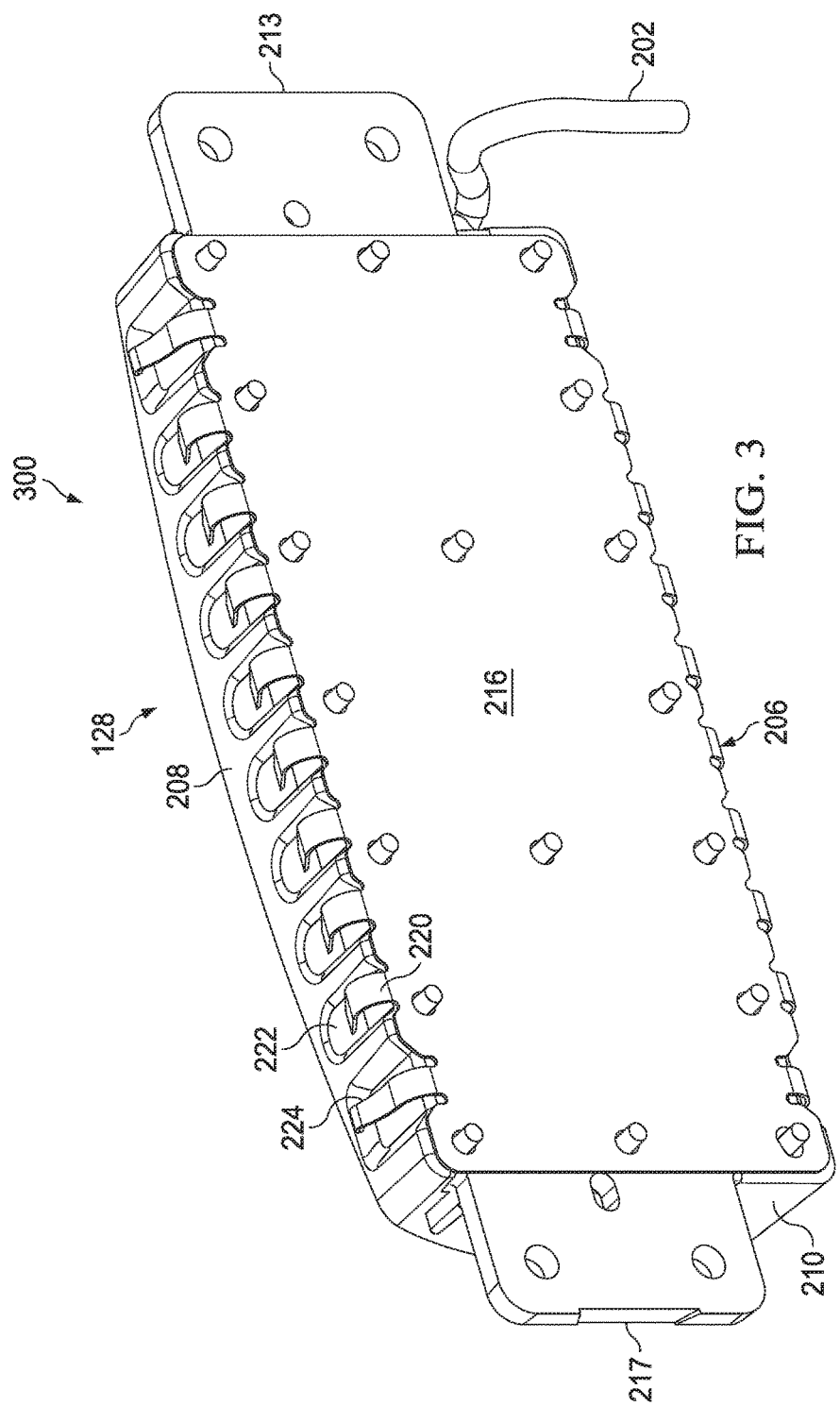
FIG. 3 is a diagram illustrating a rear perspective view of the WPAN antenna of FIG. 2 in accordance with some embodiments.
Figure 4:
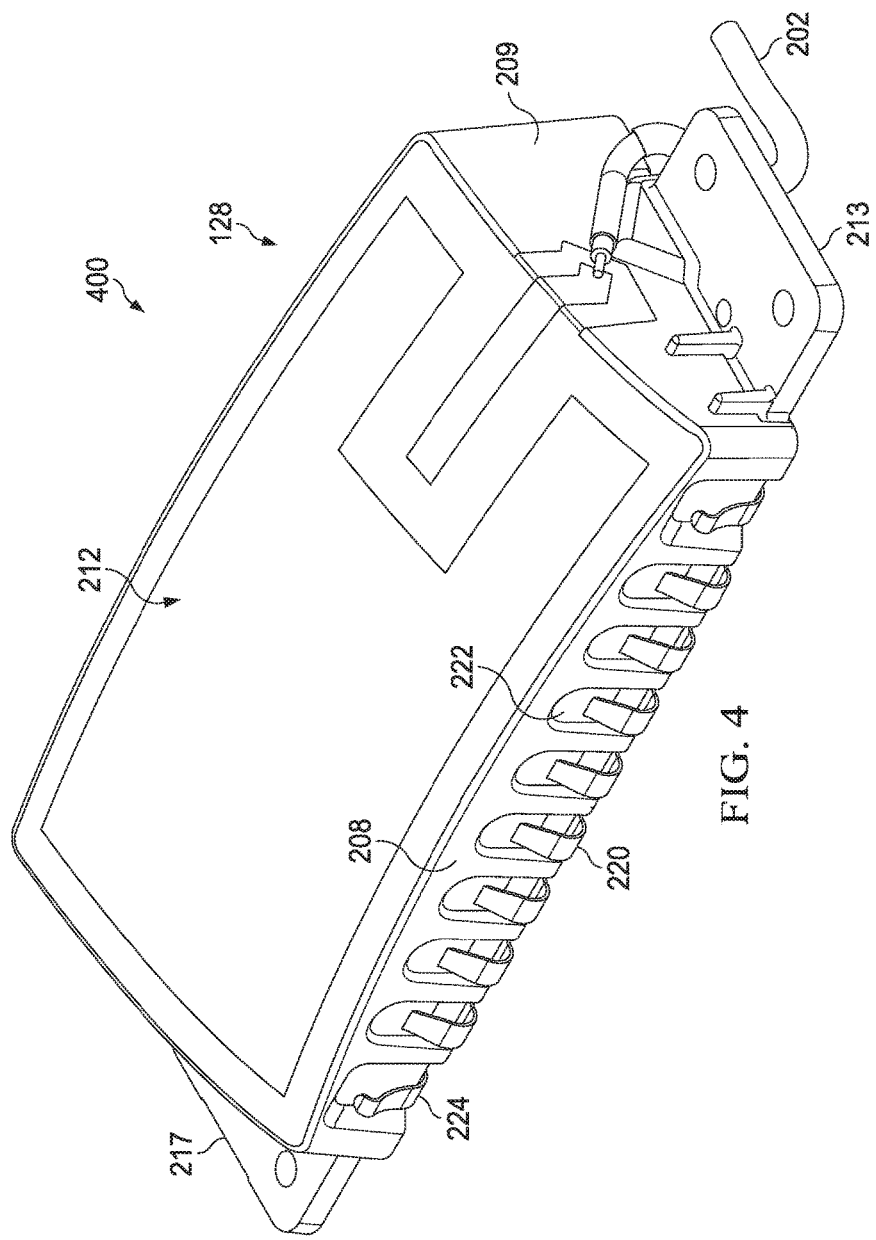
FIG. 4 is a diagram illustrating a bottom perspective view of the WPAN antenna of FIG. 2 in accordance with some embodiments.
Figure 5:
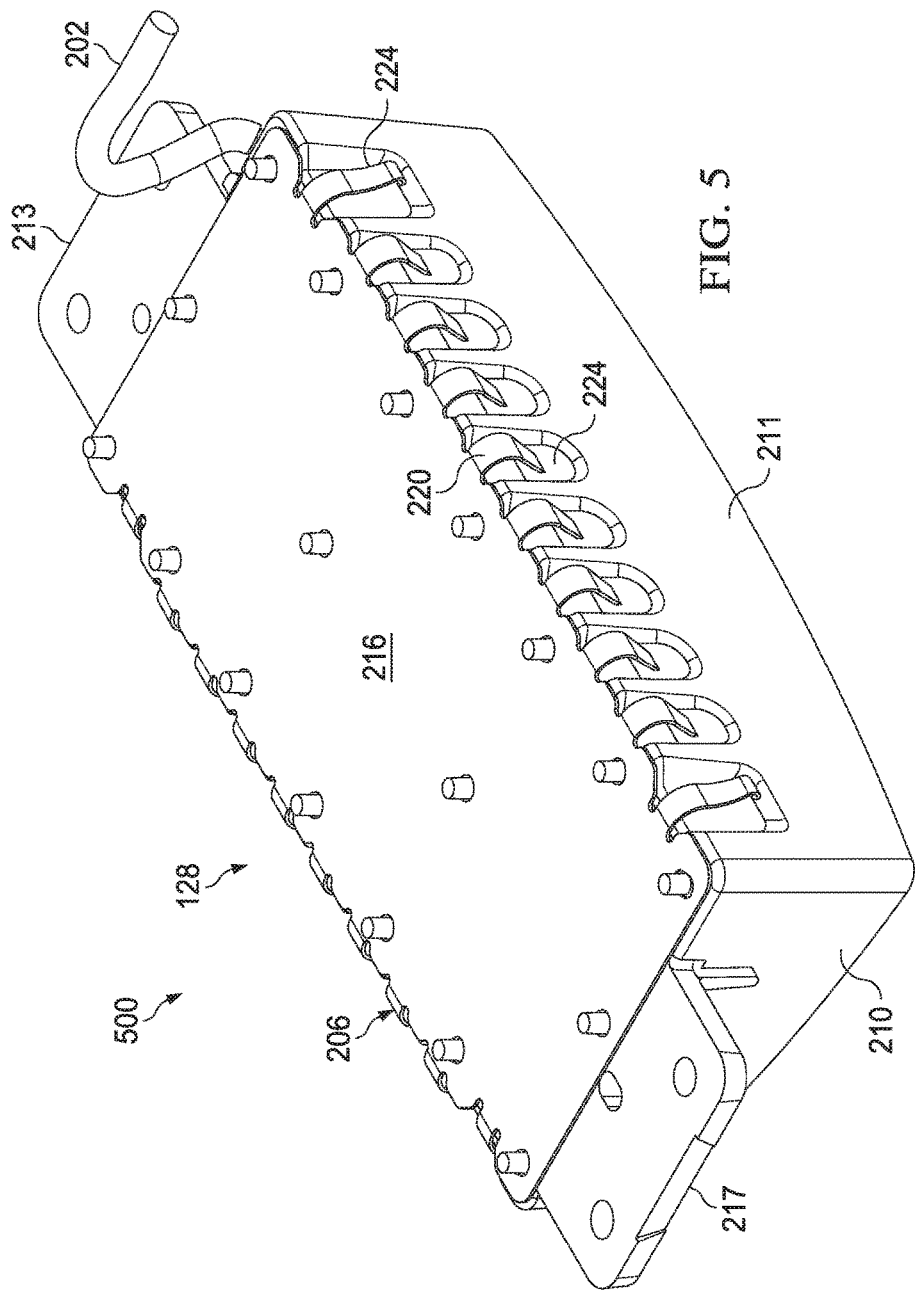
FIG. 5 is a diagram illustrating a top perspective view of the WPAN antenna of FIG. 2 in accordance with some embodiments.
Figure 6:
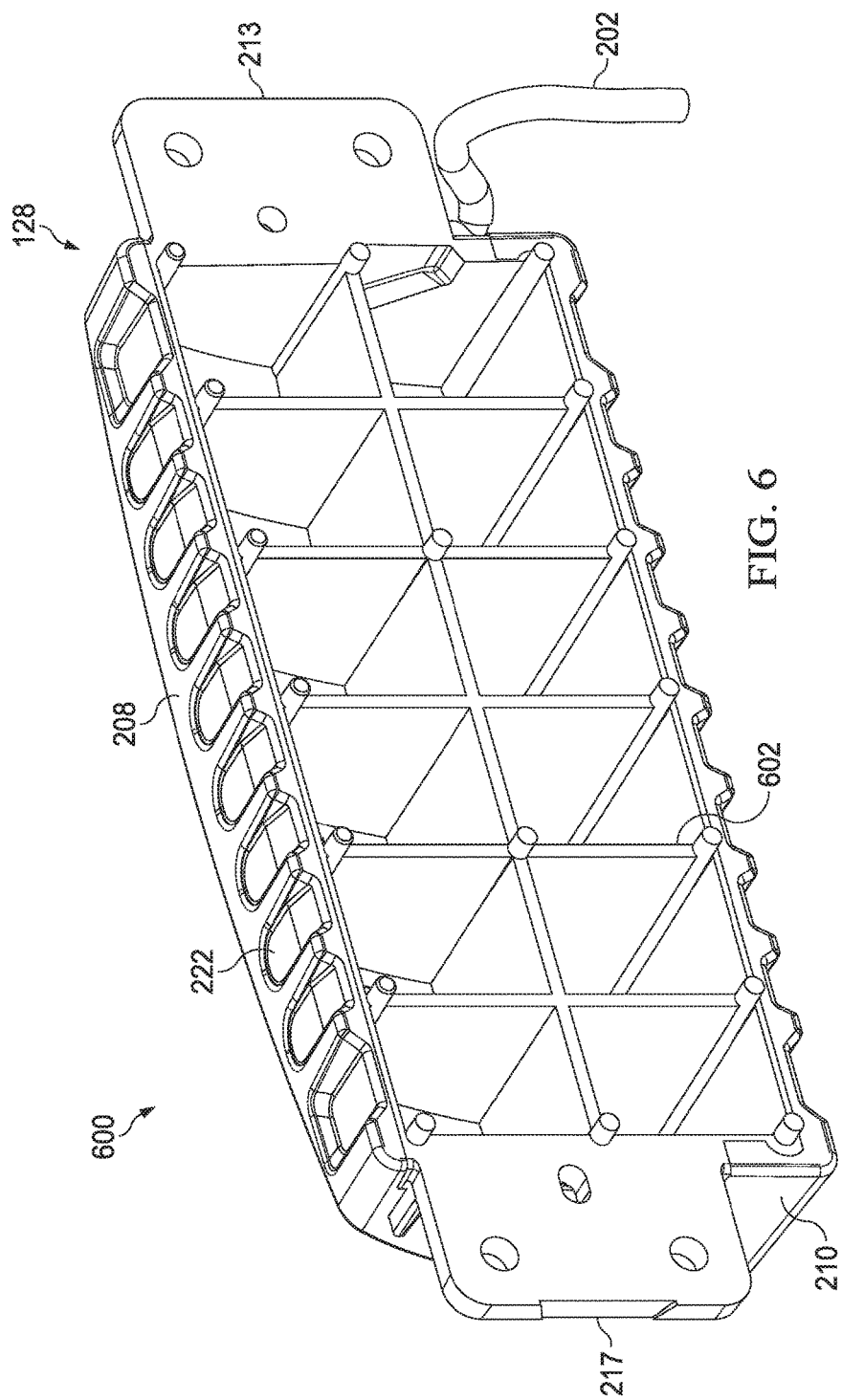
FIG. 6 is a diagram illustrating a rear perspective view of the WPAN antenna of FIG. 2 with a rear sheet metal structure removed in accordance with some embodiments.

Turning now to FIGS. 2-6, an example implementation of the WPAN antenna 128 as a directional patch antenna utilizing a 3D ground plane is described in greater detail in accordance with some embodiments. In this implementation, the WPAN antenna 128 includes a feed line 202, a front radiating surface 204, a rear ground plane structure 206, and a plurality of sidewalls 208, 209, 210, 211. The WPAN antenna 128 further may include components to facilitate attachment of the WPAN antenna 128 to the housing 106 of the HMD device 102, such as mounting tabs 213, 217. With respect to this implementation of the WPAN antenna 128, FIG. 2 illustrates a front perspective view 200, FIG. 3 illustrates a rear perspective view 300, FIG. 4 illustrates a top perspective view 400, FIG. 5 illustrates a bottom respective view 500, and FIG. 6 illustrates a rear perspective view 600 with the ground plane structure 206 removed.

The front radiating surface 204 implements a patch structure 212 comprising a planar radiating element composed of one or more metals or other conductive materials. As illustrated by view 200 of FIG. 2, this example implementation of the WPAN antenna 128 is implemented as a capacitively-coupled directional patch antenna, and thus the patch structure 212 includes a feed patch 214 (implemented as, for example, a microstrip) and a radiating patch 215, whereby the feed patch 214 is electrically coupled to the feed line 202 and capacitively coupled to the radiating patch 215 across a dielectric gap between the two patches 214, 215. Although FIGS. 2 and 4 illustrate a particular configuration for the feed patch 214 and radiating patch 215, any of a variety of configurations may be utilized as appropriate.

The sidewalls 208-211 are composed of a metal or include one or more layers of metal material and mechanically coupled so as to form a polygon perimeter structure (which in this instance is a rectangular rim structure). The rear ground plane structure 206 includes a primary planar structure 216 that is disposed at one end of the sidewalls 208-211 and which is substantially orthogonal to the sidewalls. The front radiating surface 204, in turn, is disposed at the opposite end of the sidewalls 208-211. As illustrated by views 200 and 400 and illustrated in more detail with reference to FIG. 10, the front radiating surface 204 may be non-planar and contoured so as to match the contour of the region of the housing 106 at which the WPAN antenna 128 is to be mounted. The sidewalls 208-211, the primary planar structure 216, and the front radiating surface 204 thus together form a polygon prism (in this case, a rectangular prism). Moreover, the sidewalls 208-211 and the primary planar structure 216 are composed of one or more metals, or incorporate one or more metal layers disposed on a dielectric substrate, and are so formed such that the metal of the sidewalls 208-211 and the metal of the primary planar structure 216 are electrically coupled and form, in effect, an open-ended metal box or other prism underneath the front radiating surface 204. That is, the metal of the sidewalls 208-211 and the primary planar structure 216 form a 3D ground plane that has a section that is substantially parallel with the front radiating surface 204 as well as sections that are substantially orthogonal to the front radiating surface 204.

This 3D ground plane configuration facilitates effective utilization of the WPAN antenna 128 in the HMD device 102. For one, the fringing fields formed by the sidewalls 208-211 in this 3D ground plane permit the overall dimensions of the WPAN antenna 128 to be below one-half of the wavelength of a signal having the intended center frequency for the WPAN antenna 128 The 3D configuration of the ground plane has further advantages. First, as illustrated by the configuration of FIG. 2, the capacitive loading from the side wall helps reduce the size of antenna to less than half wavelength in its electrical length. Second, the 3D configuration of ground plane forces the fields to be mostly confined within the antenna module; that is, the antenna is self-contained. Additionally, this 3D configuration reduces the impact of assembly tolerance variations. Last, as the antenna is self-contained, it is more immune to system noise, or desense. Moreover, utilizing a capacitive feed point facilitates tuning of the WPAN antenna 128 to the desired center frequency even with the smaller antenna dimensions.

The WPAN antenna 128 may be fabricated using any of a variety of techniques. For example, in some embodiments the rear ground plane structure 206 and sidewalls 208-211 are formed as a single monolithic structure through die stamping or pressing a metal sheet or through a metal casting process, and thus resulting in sidewalls 208-211 that are primarily or entirely composed of metal. However, this approach can result in an overly heavy antenna 128. Accordingly, in some embodiments, and as represented in FIGS. 2-6, the sidewalls 208-210 and front radiating surface 204 are fabricated by forming a monolithic non-conductive 3D structure 602 (see FIG. 6) through thermomolding or machining of a plastic or other dielectric material and then the plating of the external surfaces of the non-conductive 3D structure 602 corresponding to the sidewalls 208-211 and the front radiating surface 204 with one or more patterned layers of metal using a laser direct structuring (LDS) technique or other metal plating technique. As illustrated by view 600 of FIG. 6, which depicts the back of the WPAN antenna 128 with the rear ground plane structure 206 removed, the non-conductive 3D structure 602 may include internal ribs or baffling to enhance the mechanical integrity of the WPAN antenna 128. Further, in this approach, the rear ground plane structure 206 may be formed via die stamping of a metal sheet. The resulting sheet metal structure then may be affixed to the corresponding end of the 3D structure 602.

To provide mechanical and electrical coupling between the sheet metal structure of the rear ground plane structure 206 and the metallized external surfaces of the 3D structure 602, the sheet metal structure may employ a plurality of sheet metal spring contacts 220 around perimeter, wherein the spring contacts 220 are configured to engage with corresponding contact indentions 222 formed in the sidewalls 208-211, and thus mechanically binding the sheet metal structure to the 3D structure 602, while also providing a plurality of electrically-conductive contacts between the sheet metal of the rear ground plane structure 206 and the metallized sides of the sidewalls 208-210 around the perimeter of the junction between the sidewalls 208-10 and the rear ground plane structure 206. Moreover, the sheet metal structure of the rear ground plane structure 206 may include additional spring contacts 224 that are configured to contact a metal layer or structure of the housing 106 of the HMD device 102 when the WPAN antenna 128 is mounted thereon, and thus electrically grounding the 3D ground plane to the housing 106.

Figure 7:
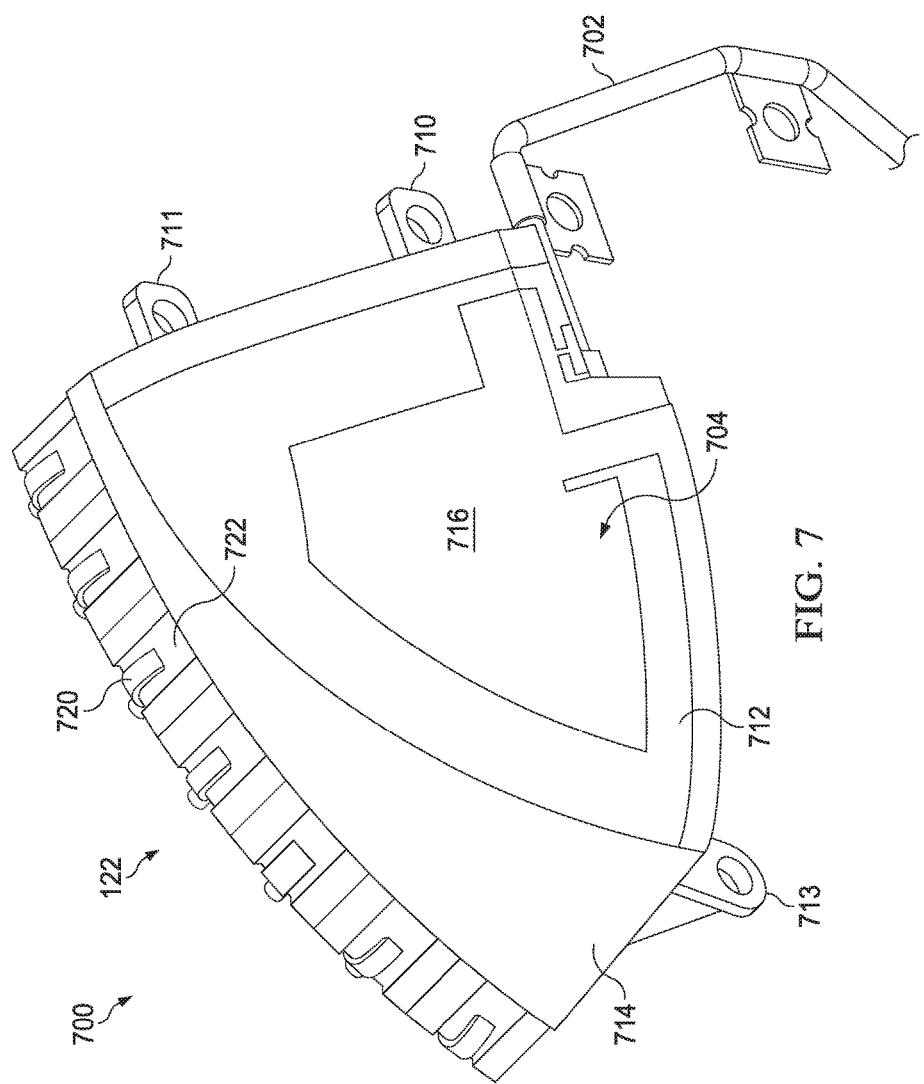
FIG. 7 is a diagram illustrating a left-side perspective view of a WLAN antenna of the HMD device of the system of FIG. 1 in accordance with some embodiments.
Figure 8:
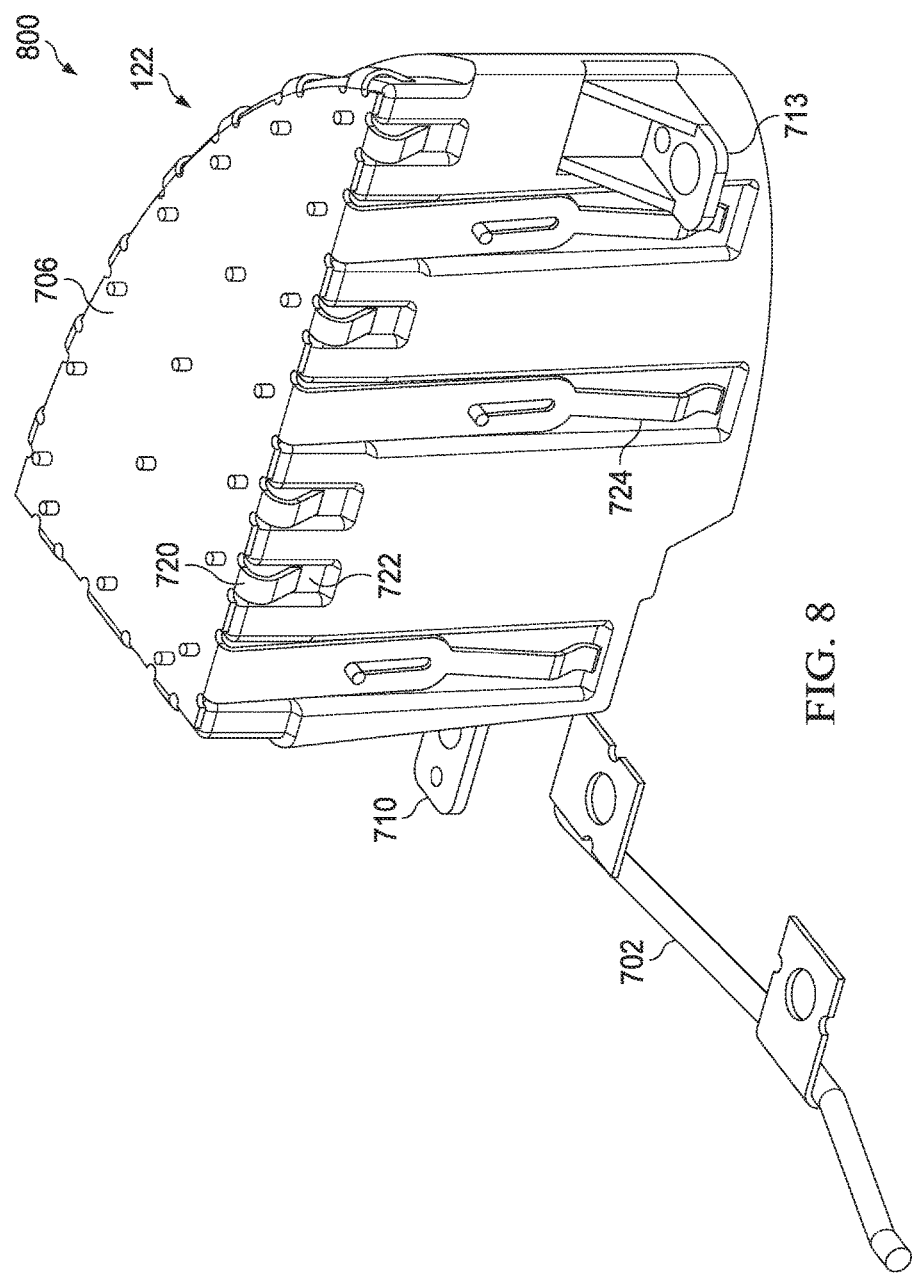
FIG. 8 is a diagram illustrating a rear perspective view of the WLAN antenna of FIG. 7 in accordance with some embodiments.
Figure 9:
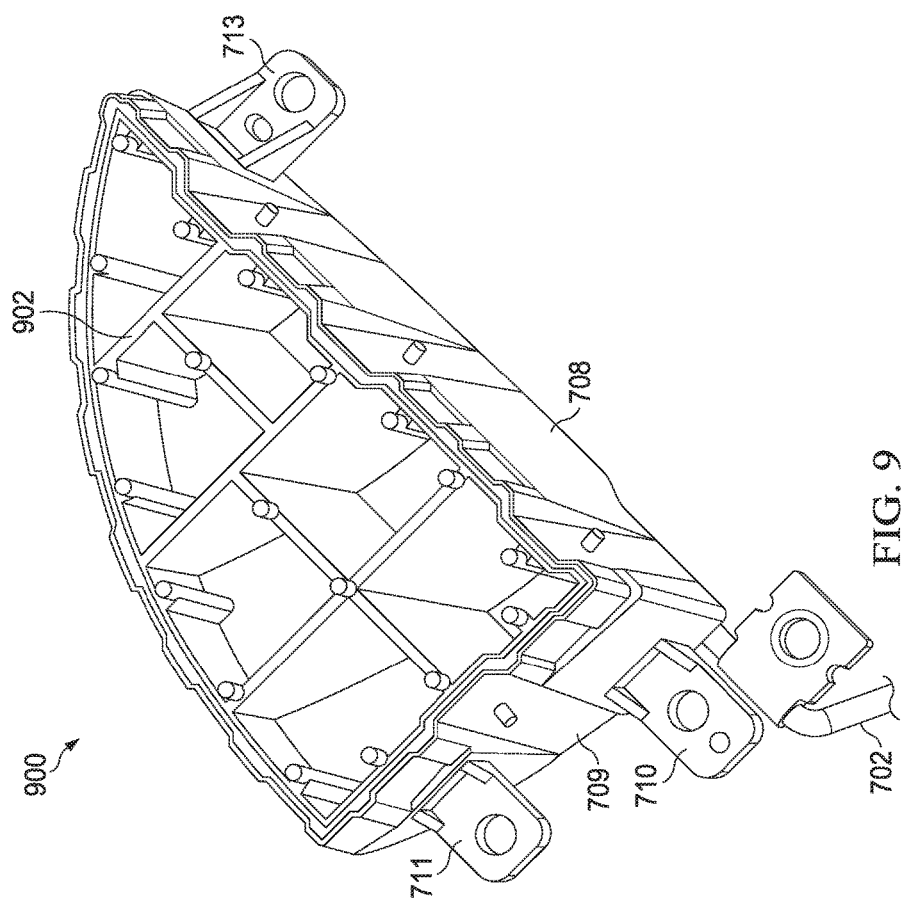
FIG. 9 is a diagram illustrating a perspective view of the WLAN antenna of FIG. 7 with a rear sheet metal structure removed in accordance with some embodiments.

FIGS. 7-9 illustrate an example implementation of the WLAN antenna 122 as a directional inverted F antenna (PIFA) utilizing a 3D ground plane in accordance with some embodiments. The WLAN antenna 124 may be implemented in the same manner. In this implementation, the WLAN antenna 122 utilizes a 3D ground plane like the implementation of the WPAN antenna 128 of FIGS. 2-6. Accordingly, the WLAN antenna 124 includes a feed line 702, a side radiating surface 704, a ground plane structure 706, a plurality of sidewalls 708, 709, and components to facilitate attachment of the WLAN antenna 122 to the housing 106 of the HMD device 102, such as mounting tabs 710, 711, 713. With respect to this implementation of the WPAN antenna 128, FIG. 7 illustrates a front perspective view 700, FIG. 8 illustrates a side perspective view 800, and FIG. 9 illustrates a rear perspective view 900 with the ground plane structure 706 removed.

The front radiating surface 704 implements a patch structure 712 comprising a planar radiating element composed of one or more metals or other conductive materials. As illustrated by view 700 of FIG. 7, this example implementation of the WLAN antenna 121 is implemented as a PIFA and thus the patch structure 212 includes a radiating patch 716 electrically coupled to the feed line 702 and electrically isolated from a conductive border region 714 of the front radiating surface 704 by a dielectric gap. Although FIG. 7 illustrates a particular configuration, any of a variety of patch configurations may be utilized as appropriate.

The sidewalls 708, 709 are composed of a metal or include one or more layers of metal material and mechanically coupled so as to form a polygon perimeter structure (which in this instance is a rectangular rim structure). The rear ground plane structure 706 includes a primary planar structure that is disposed at one end of the sidewalls 708, 709 and which is substantially orthogonal to the sidewalls. The front radiating surface 704, in turn, is disposed at the opposite end of the sidewalls 708, 709. As illustrated by views 700, 800, and 900, and as illustrated in more detail with reference to FIG. 10, the front radiating surface 704 may be non-planar and contoured so as to match the contour of the region of the housing 106 at which the WLAN antenna 121 is to be mounted.

As with the WPAN antenna 128, the sidewalls 708, 709 and rear ground plane structure 706 may be fabricated as a single monolithic metal structure via die stamping of a metal sheet or metal casting or forging, and to which the front radiating surface 704 is affixed, or as depicted by the implementation of FIGS. 7-9, the sidewalls 708, 709 and front radiating surface 704 may be formed from a monolithic non-conductive 3D structure 902 (FIG. 9) with patterned metal layers formed on the external surfaces, and the rear ground plane structure 706 formed from a die-stamped sheet metal structure utilizing spring contacts 720 at the perimeter to mechanically and electrically coupled the sheet metal structure to the sidewalls 708, 709 via corresponding contact indentions 722 formed in the sidewalls 708, 709, and utilizing spring contacts 724 at the perimeter to provide an electrical connection to a metal layer of the housing 106 as described in detail below.

Figure 10:
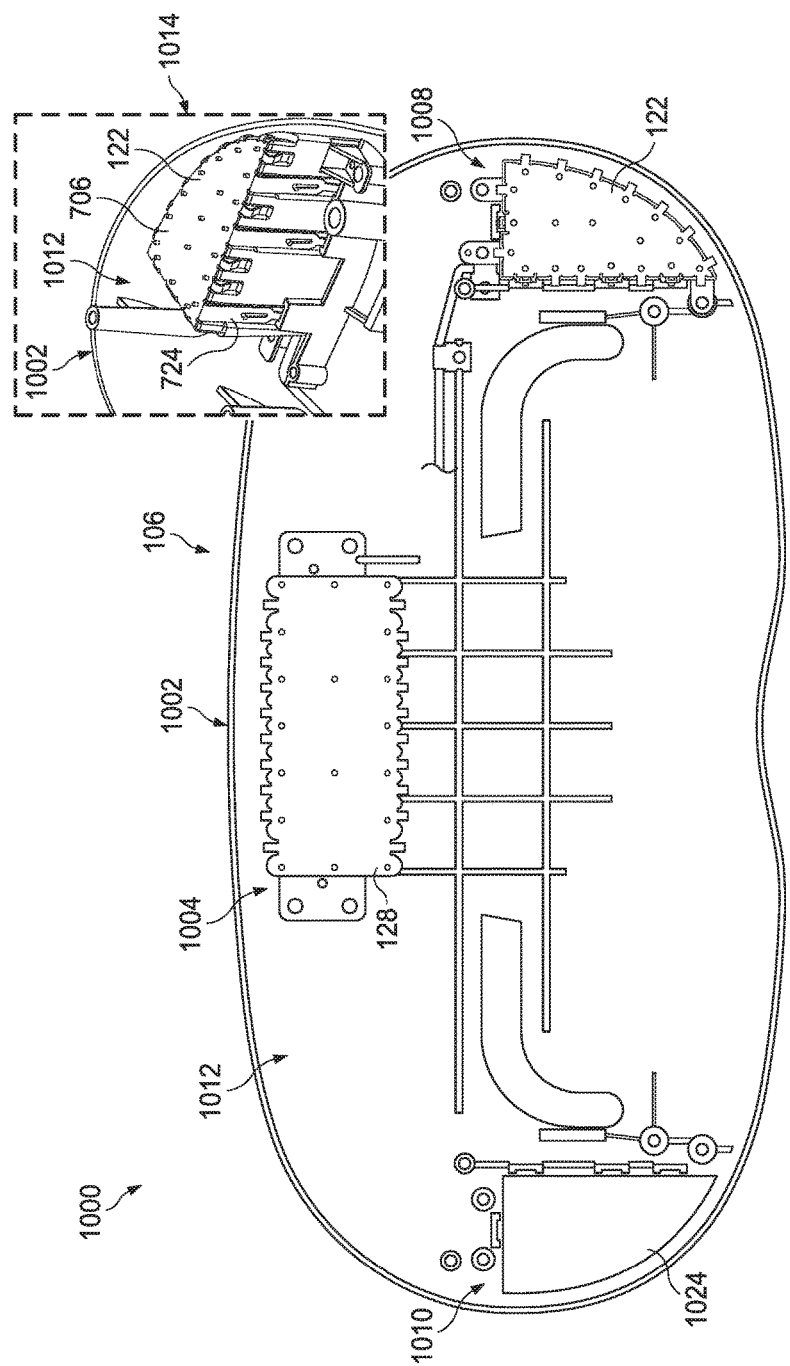
FIG. 10 is a diagram illustrating a housing of the HMD device of the system of FIG. 1 with the WPAN antenna of FIG. 2 and the WLAN antenna of FIG. 7 mounted thereon in accordance with some embodiments.

FIG. 10 illustrates a rear view 1000 of a front panel 1002 of the housing 106 of the HMD device 102 in accordance with some embodiments. In this view, the illustrated surface of the front panel 1002 would be facing the user when the housing 106 is mounted on the user's head. As shown, the WPAN antenna 128 is mounted on the front panel 1002 such that the rear ground plane structure 206 faces posteriorly and the front radiating surface 204 (FIG. 2) faces anteriorly. The WPAN antenna 128 is mounted in an upper medial region 1004 of the front panel 1002 such that the WPAN antenna 128 is substantially laterally centered in the front panel 1002 (and thus centered about the sagittal plane 140 (FIG. 1) of the user when the HMD device 102 is mounted) and is proximate to a top perimeter 1006 or edge of the front panel 1002. In contrast, the WLAN antenna 122 is mounted in a right lateral region 1008 of the front panel 1002 and the WLAN antenna 124 (not shown in FIG. 10) is to be mounted in a left lateral region 1010 of the front panel 1002 such that the WLAN antennas 122, 124 are located proximate to the right and left, respectively, lower edges of the front panel 1002 that are at the maximum points of distance from the center region 1004 along the perimeter of the front panel 1002. As a result, the particular arrangement of the placements of the WPAN antenna 128 and the WLAN antenna 122, 124 provides a suitable balance of maintaining adequate distance between the WLAN antennas 122, 124 and between each of the WLAN antennas 122, 124 and the WPAN antenna 128 for spatial isolation of the antennas 122, 124, 128, as well as facilitating effective symmetric wireless coverage by the WPAN antenna 128 for the wireless handheld controllers 132, 134 by placing the WPAN antenna 128 in a medial region of the HMD device 102 and facilitating effective MIMO operation of the WLAN antennas 122, 124 by placing the WLAN antennas 122, 124 at the lateral edges of the HMD device 102.

In some embodiments, a metal layer may be disposed on part or all of the interior surface 1012 of the front panel 1002 via, for example, metal plating or affixing a metal foil to the interior surface 1012. The antennas 122, 124, 128 then may utilize a contact mechanism to electrically couple their rear ground planes to the metal layer of the interior surface 1012. For example, as shown by detail view 1014 illustrating an enlarged side view of the WLAN antenna 122 mounted on the front panel 1002, when the WLAN antenna 122 is so mounted, the spring contacts 724 of the rear ground plane structure 706 physically contact the metallized interior surface 1012 of the front panel 1002, and forming electrically conductive paths between the metallized interior surface 1012 and the rear ground plane structure 706. The rear ground plane structure 206 of the WPAN antenna 128 is similarly electrically connected to the metallized interior surface 1012 of the front panel 1002 via the spring contacts 224 (FIG. 2). The electrical connection of the rear ground plane structures of the antennas 122, 124, 128 and the metallized interior surface 1012 has the effect of grounding the ground planes of these antenna to the same metallized surface of the front panel 1002 so as to reduce or eliminate parasitic resonance which can degrade the antenna performance. To further avoid interference with the antennas 122, 124, 128, the front panel 1002 may include apertures through which the patch radiating surfaces may extend, such as the aperture 1024 in the front panel 1002 for the WLAN antenna 124 (not shown) depicted in view 1000.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) device comprising:
a housing configured to mount on a face of a user and comprising a metal layer disposed at an interior surface of the housing;
at least one display mounted in the housing;
a wireless personal area network (WPAN) antenna mounted in a medial region of the housing, the WPAN antenna comprising a directional patch antenna, wherein the WPAN antenna comprises:
a feed line;
a three-dimensional (3D) conductive ground plane comprising:
a plurality of conductive sidewalls, wherein the plurality of sidewalls comprise one or more metal layers disposed on corresponding surfaces of the 3D structure; and
a ground plane structure disposed at a first end of the sidewalls, the ground plane structure perpendicular to the plurality of sidewalls and electrically coupled to the plurality of conductive sidewalls, wherein the ground plane structure comprises a sheet metal structure conductively coupled to the one or more metal layers of the plurality of sidewalls, wherein the sheet metal structure comprises a first plurality of sheet metal spring contacts, each sheet metal spring contact configured to mechanically and electrically couple the sheet metal structure to a corresponding sidewall of the plurality of sidewalls via corresponding contact indentions in the corresponding sidewall, wherein the sheet metal structure comprises a second plurality of sheet metal spring contacts to contact the metal layer disposed at the interior surface; and
a radiating surface disposed at a second end of the sidewalls opposite of the first end, the radiating surface comprising a patch antenna structure coupled to the feed line, wherein the patch antenna structure comprises:
a radiating patch; and
a feed patch capacitively coupled to the radiating patch, wherein the radiating patch and feed patch comprise one or more metal layers disposed on a corresponding surface of a non-conductive 3D structure; and first and second wireless local area network (WLAN) antennas located at respective lateral peripheral regions of the housing.

2. The HMD device of claim 1, wherein:
the first and second WLAN antennas are configured to operate in accordance with at least one IEEE 802.11 wireless specification; and
the WPAN antenna is configured to operate in accordance with one or more of: at least one Bluetooth specification or at least one IEEE 802.15 wireless specification.

3. The HMD device of claim 2, wherein the first and second WLAN antennas together provide a two-channel multiple-input multiple-output (MIMO) antenna.

4. The HMD device of claim 1, wherein:
the HMD device is configured to operate in conjunction with at least one wireless handheld controller; and
the WPAN antenna is configured to wirelessly communicate with the at least one wireless handheld controller.

5. The HMD device of claim 1, wherein:
the WPAN antenna is located proximate to a top edge of the housing; and
the first and second WLAN antennas are located proximate to respective lateral edges of the housing.

6. The HMD device of claim 1, wherein:
the non-conductive 3D structure comprises a plastic structure; and
the one or more metal layers of the plurality of sidewalls and the one or more metal layers of the radiating patch and feed patch comprise patterned metal layers deposited on corresponding surfaces of the plastic structure.

7. The HMD device of claim 1, wherein the radiating surface is contoured to match a corresponding contour of a region of the housing at a mounting point for the WPAN antenna.

8. In a head mounted display (HMD) device, a method comprising:
communicating first wireless signaling via a directional patch antenna of a wireless personal area network (WPAN) antenna mounted in a medial region of a housing of the HMD device, wherein the housing comprises a metal layer disposed at an interior surface of the housing, wherein the WPAN antenna comprises:
a feed line;
a three-dimensional (3D) conductive ground plane comprising:
a plurality of conductive sidewalls, wherein the plurality of sidewalls comprise one or more metal layers disposed on corresponding surfaces of the 3D structure; and
a ground plane structure disposed at a first end of the sidewalls, the ground plane structure perpendicular to the plurality of sidewalls and electrically coupled to the plurality of conductive sidewalls, wherein the ground plane structure comprises a sheet metal structure conductively coupled to the one or more metal layers of the plurality of sidewalls, wherein the sheet metal structure comprises a first plurality of sheet metal spring contacts, each sheet metal spring contact configured to mechanically and electrically couple the sheet metal structure to a corresponding sidewall of the plurality of sidewalls via corresponding contact indentions in the corresponding sidewall, wherein the sheet metal structure comprises a second plurality of sheet metal spring contacts to contact the metal layer disposed at the interior surface; and a radiating surface disposed at a second end of the sidewalls opposite of the first end, the radiating surface comprising a patch antenna structure coupled to the feed line, wherein the patch antenna structure comprises:
a radiating patch; and
a feed patch capacitively coupled to the radiating patch, wherein the radiating patch and feed patch comprise one or more metal layers disposed on a corresponding surface of a non-conductive 3D structure; and
communicating second wireless signaling via at least one of first and second wireless local area network (WLAN) antennas located at respective lateral peripheries of the housing.

9. The method of claim 8, wherein:
communicating the first wireless signaling comprises communicating the second signaling in accordance with one or more of: at least one Bluetooth specification or at least one IEEE 802.15 specification; and
communicating the second wireless signaling comprises communicating the first wireless signaling in accordance with at least IEEE 802.11 specification.

10. The method of claim 8, wherein:
the HMD device is configured to operate in conjunction with at least one wireless handheld controller; and
communicating the first wireless signaling comprises communicating the first wireless signaling between the WPAN antenna and the at least one wireless handheld controller.

11. A directional patch antenna comprising:
a feed line;
a three-dimensional (3D) ground plane comprising:
a plurality of conductive sidewalls, wherein the plurality of sidewalls comprise one or more metal layers disposed on corresponding surfaces of the 3D structure; and
a conductive ground plane structure disposed at a first end of the sidewalls, the ground plane structure perpendicular to the plurality of sidewalls and electrically coupled to the plurality of conductive sidewalls, wherein the ground plane structure comprises a sheet metal structure conductively coupled to the one or more metal layers of the plurality of sidewalls, wherein the sheet metal structure comprises a first plurality of sheet metal spring contacts, each sheet metal spring contact configured to mechanically and electrically couple the sheet metal structure to a corresponding sidewall of the plurality of sidewalls via corresponding contact indentions in the corresponding sidewall, wherein the sheet metal structure comprises a second plurality of sheet metal spring contacts to contact the metal layer disposed at the interior surface; and
a radiating surface disposed at a second end of the sidewalls opposite of the first end, the radiating surface comprising a patch antenna structure coupled to the feed line, wherein the patch antenna structure comprises:
a radiating patch; and
a feed patch capacitively coupled to the radiating patch, wherein the radiating patch and feed patch comprise one or more metal layers disposed on a corresponding surface of a non-conductive 3D structure.

12. The directional patch antenna of claim 11, wherein:
the non-conductive 3D structure comprises a plastic structure; and the one or more metal layers of the plurality of sidewalls and the one or more metal layers of the radiating patch and feed patch comprise patterned metal layers deposited on corresponding surfaces of the plastic structure.

* * * * *